US008648257B2

(12) United States Patent
Kim et al.

(10) Patent No.: US 8,648,257 B2
(45) Date of Patent: Feb. 11, 2014

(54) INSULATION MATERIAL COMPOSITION FOR DC POWER CABLE AND THE DC POWER CABLE USING THE SAME

(75) Inventors: Yoon-Jin Kim, Gunpo-si (KR); Chang-Mo Ko, Gwangmyeong-si (KR); Jin-Ho Nam, Namyangju-si (KR); Ho-Souk Cho, Seoul (KR); Young-Ho Park, Anyang-si (KR)

(73) Assignee: LS Cable & System Ltd., Anyang (KR)

( * ) Notice: Subject to any disclaimer, the term of this patent is extended or adjusted under 35 U.S.C. 154(b) by 0 days.

(21) Appl. No.: 13/228,566

(22) Filed: Sep. 9, 2011

(65) Prior Publication Data

US 2012/0000694 A1 Jan. 5, 2012

Related U.S. Application Data

(63) Continuation of application No. PCT/KR2010/005650, filed on Aug. 24, 2010.

(30) Foreign Application Priority Data

Apr. 2, 2010 (KR) .................. 10-2010-0030232

(51) Int. Cl.
*H01B 7/00* (2006.01)

(52) U.S. Cl.
USPC .................. 174/110 R; 174/110 SR

(58) Field of Classification Search
USPC .............. 174/102 R, 108, 109, 110 R, 113 R, 174/120 R, 120 SC
See application file for complete search history.

(56) References Cited

U.S. PATENT DOCUMENTS

| 3,971,882 | A | | 7/1976 | Alia |
|---|---|---|---|---|
| 4,505,887 | A | * | 3/1985 | Miyata et al. ................. 423/635 |
| 4,766,162 | A | * | 8/1988 | Hamamoto et al. .......... 523/440 |
| 6,262,161 | B1 | * | 7/2001 | Betso et al. .................... 524/425 |
| 2003/0055179 | A1 | * | 3/2003 | Ota et al. ....................... 525/242 |
| 2003/0176588 | A1 | * | 9/2003 | Roth et al. .................... 525/374 |
| 2004/0020681 | A1 | * | 2/2004 | Hjortstam et al. ....... 174/102 SC |
| 2006/0167139 | A1 | * | 7/2006 | Nelson et al. ................. 523/212 |
| 2007/0293086 | A1 | * | 12/2007 | Liu et al. ....................... 439/578 |
| 2010/0036035 | A1 | * | 2/2010 | Nelson et al. ................. 524/433 |

FOREIGN PATENT DOCUMENTS

| EP | 0332729 | A1 | | 9/1989 | |
|---|---|---|---|---|---|
| EP | 0453262 | A2 | | 10/1991 | |
| JP | 04-368720 | | | 12/1991 | |
| JP | 2541034 | B2 | | 10/1996 | |
| JP | 10-251460 | | | 9/1998 | |
| JP | 10-251460 | A | | 9/1998 | |
| JP | 11-086634 | | | 3/1999 | |
| JP | 3430875 | B2 | | 7/2003 | |
| JP | 2007-103247 | | | 4/2007 | |
| JP | 2007-103247 | A | * | 4/2007 | ............... H01B 3/44 |

* cited by examiner

Primary Examiner — William H Mayo, III
(74) Attorney, Agent, or Firm — NSIP Law

(57) ABSTRACT

An insulation material composition for a direct current (DC) power cable and the DC power cable using the same are provided. A direct current (DC) power cable insulation material composition includes 0.5 to 5 parts by weight of surface-modified nano-sized cubic magnesium oxide, per 100 parts by weight of a polyethylene base resin.

16 Claims, 5 Drawing Sheets

INSULATION MATERIAL COMPOSITION FOR DC POWER CABLE AND THE DC POWER CABLE USING THE SAME

CROSS-REFERENCE TO RELATED APPLICATION

This application is a continuation application of International Application PCT/KR2010/005650, filed on Aug. 24, 2010, which claims the benefit under 35 U.S.C. §119(a) of Korean Patent Application No. 10-2010-0030232, filed on Apr. 2, 2010, the entire disclosure of which is incorporated herein by reference for all purposes.

BACKGROUND

1. Field

The following description relates to an insulation material composition for direct current (DC) power cables, and, more particularly, to an insulation formed from an insulation material composition that may be used to DC power cables which are suitable as high voltage DC transmission lines.

2. Description of Related Art

A power cable being currently used includes a conductor 1, an inner semiconducting layer 2, an insulation 3, an outer semiconducting layer 4, a lead sheath 5 and a polyethylene (PE) sheath 6, as shown in FIGS. 1a and 1b.

Polyethylene and crosslinked polyethylene have been widely used as the insulation 3 of the power cable. However, in a case where a power cable with an insulation made from polyethylene or crosslinked polyethylene is used as a high voltage transmission line, several problems may occur. For example, when a high voltage DC is applied to a cable, a space charge may generate due to movement of electric charges from an electrode into an insulation and influences of crosslinking by-products. If such a space charge is accumulated in a polyethylene insulation by a high voltage DC applied to a power cable, the electric field strength of the power cable near a conductor increases, resulting in reduced breakdown voltage of the cable.

To solve the problem, solutions have been suggested to form an insulation using magnesium oxide. Magnesium oxide basically has a face centered cubic (FCC) crystal structure, but it may have various shapes, purity, crystallinity and properties according to synthesis methods. Magnesium oxide has cubic, terrace, rod-like, porous and spherical shapes, as shown in FIGS. 2a through 2e, and each shape may be used depending on specific properties. In particular, spherical magnesium oxide is used to suppress a space charge of a power cable, as suggested in Japanese Patent Nos. 2541034 and 3430875. As mentioned above, studies have been made to suppress a space charge in a power cable with an insulation made from polyethylene or crosslinked polyethylene. Therefore, an insulation material composition for a DC power cable having an excellent space charge suppression effect is desired.

SUMMARY

In one general aspect, there is provided a direct current (DC) power cable insulation material composition, including 0.5 to 5 parts by weight of surface-modified nano-sized cubic magnesium oxide, per 100 parts by weight of a crosslinked low-density polyethylene base resin.

The general aspect of the composition may further provide, per 100 parts by weight of the low-density polyethylene base resin, 0.1 to 3 parts by weight of a dicumylperoxide crosslinking agent, and 0.1 to 2 parts by weight of an additive, the additive including an antioxidant, an ion scavenger, or a combination thereof.

The general aspect of the composition may further provide that the magnesium oxide has a purity of 99.9% or greater and an average particle size of 500 nm or less.

The general aspect of the composition may further provide that the magnesium oxide is monocrystalline or polycrystalline.

In another aspect, there is provided a DC power cable, including an insulation including the DC power cable insulation material composition.

Other features and aspects may be apparent from the following detailed description, the drawings, and the claims.

BRIEF DESCRIPTION OF THE DRAWINGS

FIG. 3b is an enlarged view of FIG. 3a, illustrating an example of the particle size of cubic magnesium oxide particles included in the insulation example of FIG. 3a.

Figure 1A:
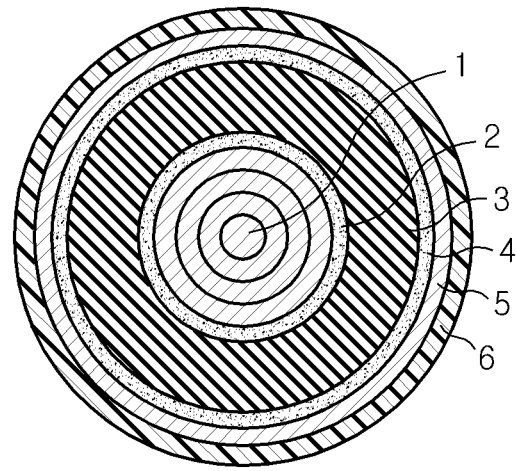
FIG. 1a is a cross-sectional view illustrating an example of a DC power cable.
Figure 1B:
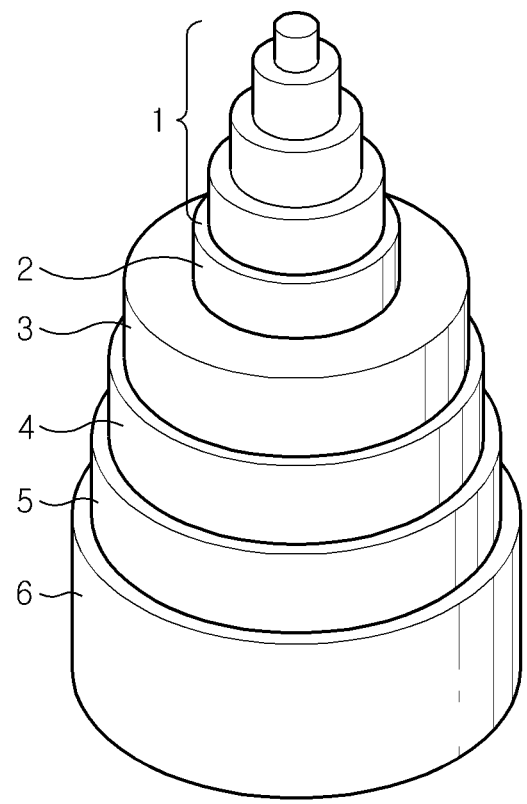
FIG. 1b is a view illustrating an example of a structure of the DC power cable.
Figure 2A:
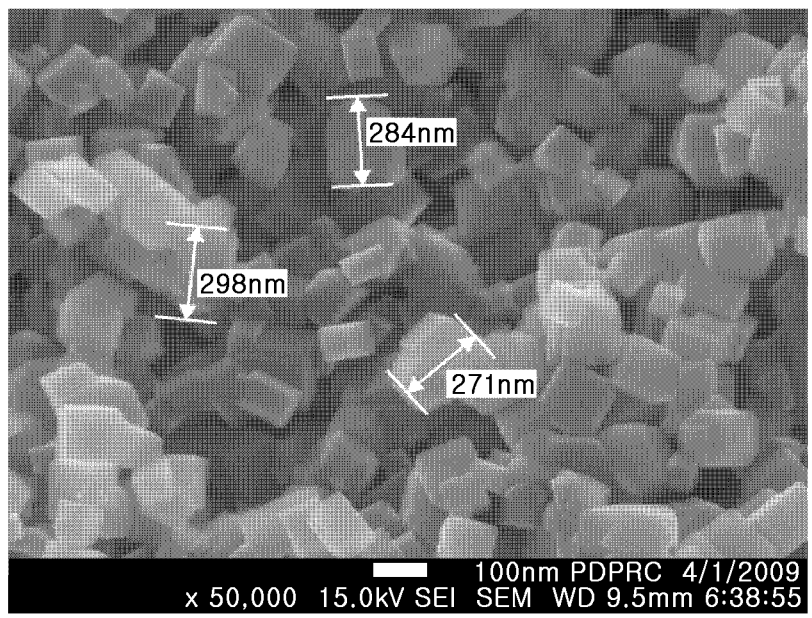
FIG. 2a is a scanning electron microscopy (SEM) image illustrating an example of cubic magnesium oxide.
Figure 2B:
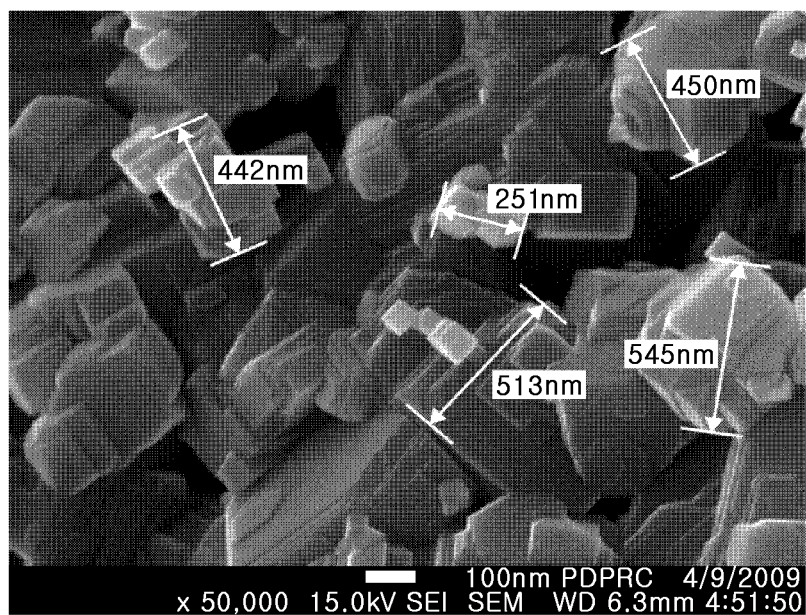
FIG. 2b is an SEM image illustrating an example of terrace magnesium oxide.
Figure 2C:
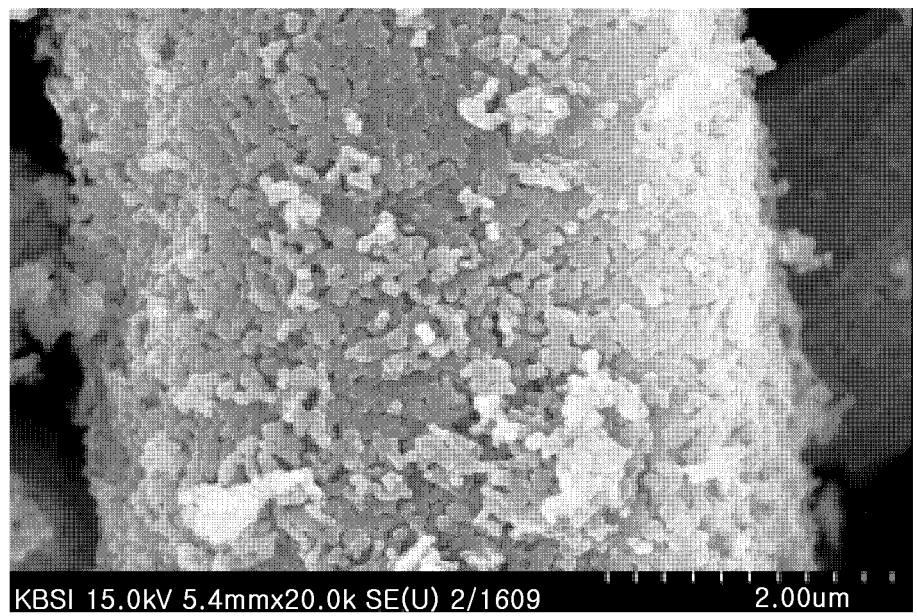
FIG. 2c is an SEM image illustrating an example of rod-like magnesium oxide.
Figure 2D:
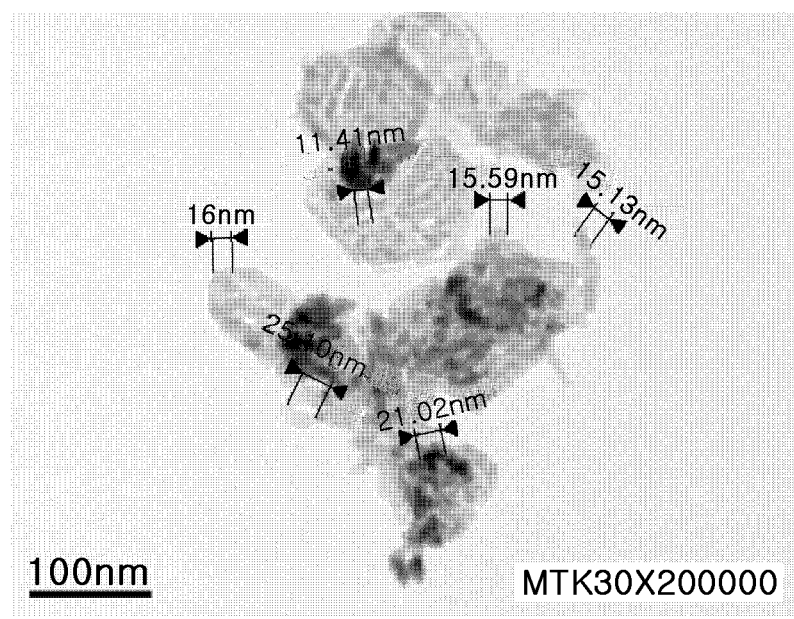
FIG. 2d is a transmission electron microscopy (TEM) image illustrating an example of porous magnesium oxide.
Figure 2E:
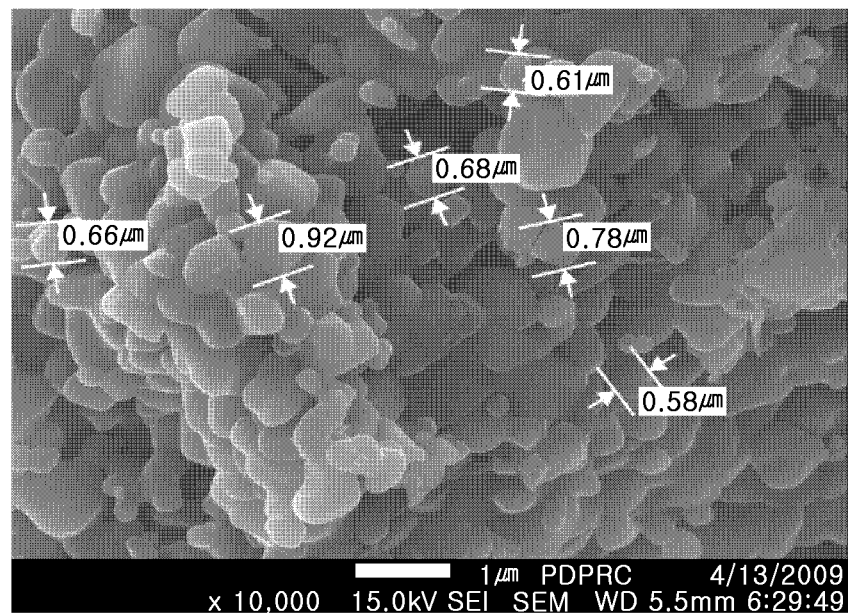
FIG. 2e is an SEM image illustrating an example of spherical magnesium oxide.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the apparatuses described herein. Accordingly, various changes, modifications, and equivalents of the apparatuses described herein will be suggested to those of ordinary skill in the art. Also, descriptions of well-known functions and constructions may be omitted for increased clarity and conciseness.

An example of an insulation material composition includes 0.5 to 5 parts by weight of surface-modified nano-sized cubic magnesium oxide, per 100 parts by weight of a crosslinked low-density polyethylene base resin.

The insulation material composition may further include 0.1 to 3 parts by weight of a dicumyl peroxide crosslinking agent, and 0.1 to 2 parts by weight of an additive, the additive including an antioxidant, an ion scavenger, or a combination thereof.

The magnesium oxide may be surface-modified with vinyl silane, stearic acid, oleic acid, amonopolysiloxane, and so on to prevent low dispersion of the magnesium oxide in the polyethylene base resin, and deterioration of electrical properties. For example, a related magnesium oxide may be hydrophilic, i.e., having high surface energy, while a related polyethylene base resin may be hydrophobic, i.e., having low surface energy. As a result, dispersion of the related magnesium oxide in the related polyethylene base resin may be low, and electrical properties may be deteriorated.

Thus, the surface of the magnesium oxide is modified, which may be able prevent low dispersion of the magnesium oxide in the polyethylene base resin and subsequent deterioration of electrical properties. Without surface modification of the magnesium oxide, a gap is generated between the magnesium oxide and the polyethylene base resin, which causes a reduction in mechanical properties, and electrical properties such as breakdown strength.

For example, surface modification of magnesium oxide with vinyl silane may provide an excellent dispersion in the polyethylene base resin and improved electrical properties. Hydrolysable groups of vinyl silane are chemically bonded to the surface of the magnesium oxide by a condensation reaction, so that the magnesium oxide is surface-modified. Next, a silane group of the surface-modified magnesium oxide reacts with the polyethylene base resin, which may provide an excellent dispersion.

For example, the magnesium oxide has a purity between 99.9% and 100% and an average particle size of 500 nm or less. Further, the magnesium oxide may have both monocrystalline and polycrystalline structures.

The surface-modified nano-sized cubic magnesium oxide is included at an amount of 0.5 to 5 parts by weight. In a case where the content of the surface-modified nano-sized cubic magnesium oxide is less than 0.5 parts by weight, it has a space charge suppression effect, but exhibits a relatively low DC breakdown strength. In a case that the content of the surface-modified nano-sized cubic magnesium oxide exceeds 5 parts by weight, it reduces the mechanical performance and continuous extrudability.

The antioxidant may include amine-based antioxidants, dialkylester-based antioxidants, thioester-based antioxidants, phenol-based antioxidants, or any combination thereof. The ion scavenger may include aryl-based silane, and may provide a space charge suppression effect.

An insulation for a power cable including the insulation material composition example may be used in manufacturing a DC power cable.

Hereinafter, the insulation material composition will be described through examples. However, one having ordinary skill in the art would understand that the descriptions provided herein are non-limiting examples for the purpose of illustration only.

Insulation material compositions of examples and comparative examples were prepared according to composition of the following table 1, to determine changes in performance depending on the shape and particle size of magnesium oxide of an insulation material composition for a DC power cable. The unit of content in Table 1 is parts by weight.

TABLE 1

| Components | | Example 1 | Example 2 | Example 3 | Comparative example 1 | Comparative example 2 | Comparative example 3 |
|---|---|---|---|---|---|---|---|
| Content of base resin | | 100 | 100 | 100 | 100 | 100 | 100 |
| Magnesium oxide | Content | 2.0 | 2.0 | 2.0 | None | 2.0 | 2.0 |
| | Shape | Cubic | Cubic | Cubic | | Terrace | Spherical |
| | D50(nm) | 70 | 100 | 240 | | 100 | 100 |
| | D99(nm) | 110 | 150 | 270 | | 150 | 150 |
| | Purity(%) | 99.95 | 99.95 | 99.95 | | 99.95 | 99.95 |
| Content of crosslinking agent | | 2 | 2 | 2 | 2 | 2 | 2 |
| Content of antioxidant | | 0.4 | 0.4 | 0.4 | 0.4 | 0.4 | 0.4 |

The components of Table 1 are as follows:

Base resin: Crosslinked low-density polyethylene resin (LG chem., LE2030; Density: 0.85~0.95 kg/m$^3$, Melt index (MI): 1~2);

Magnesium oxide: Powdery magnesium oxide surface-modified with vinyl silane. For improved dispersion, roll mixing milling is made such that D99 (maximum particle size) is not three times more than D50 (average particle size);

Crosslinking agent: Dicumyl peroxide; and

Antioxidant: tetrakis-(methylene-(3,5-di-(tert)-butyl-4-hydrocinnamate))methane.

Figure 3A:
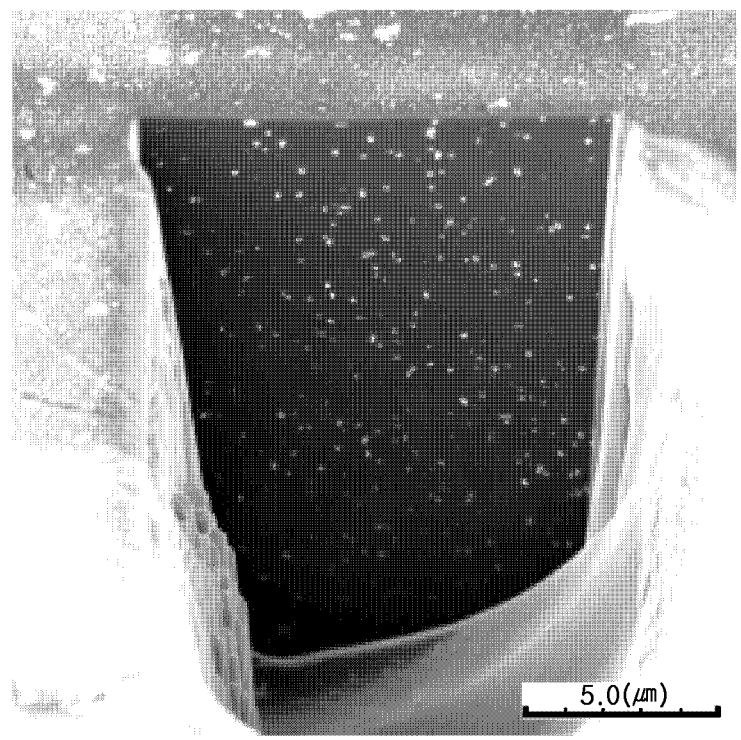
FIG. 3a is a focused ion beam (FIB)-SEM image illustrating an example of an insulation.
Figure 3B:
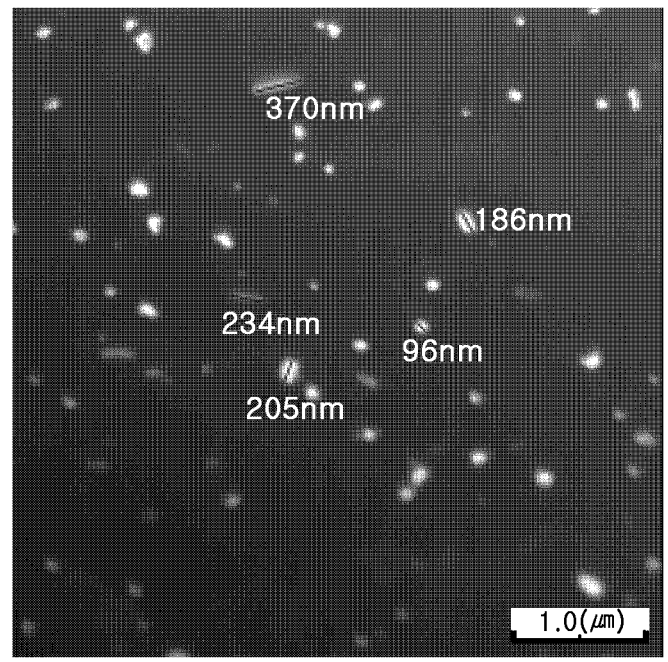
Figure 3C:
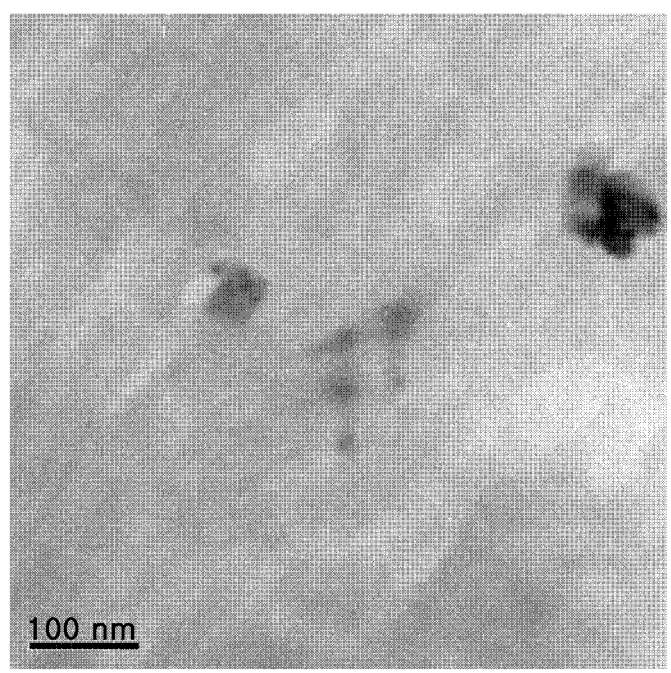
FIG. 3c is a TEM image illustrating an example of the insulation.

Master batch compounds were prepared using insulation material compositions of examples 1 to 3 and comparative examples 1 to 3, and extruded using a twin screw extruder whose screw diameter is 25 mm (L/D=60). An example of the resulting insulation is shown in FIG. 3*a* as a FIB-SEM image, and FIG. 3*b* is an enlarged view of FIG. 3*a*, illustrating an example of cubic magnesium oxide contained in the insulation. An example of the resulting insulation is also shown in FIG. 3*c* as a TEM image.

The insulations according to examples 1 to 3 and comparative examples 1 to 3 were thermocompressed to manufacture a 0.1 mm-thick section for measuring volume resistivity and DC breakdown strength, and a 1 mm-thick sheet-type section for measuring impulse strength, and the sections were tested for volume resistivity, DC breakdown strength (ASTM D149) and impulse strength. The test results are shown in the following Table 2. The test conditions are briefly described as follows:

1) Volume Resistivity:
   When a DC electric field of 80 kV/mm is applied, volume resistivity ($\times 10^{14}$ Ω·cm) is measured;

2) DC Breakdown Strength:
   DC breakdown strength (kV) is measured at 90° C.; and 3) Impulse Strength:
   A 1 mm-thick sheet-type section is connected to electrodes, with increasing voltage from 50 kV by 5 kV until the section is broken, and impulse strength is measured.

TABLE 2

| Items | Example 1 | Example 2 | Example 3 | Comparative example 1 | Comparative example 2 | Comparative example 3 |
| --- | --- | --- | --- | --- | --- | --- |
| Volume resistivity ($\times 10^{14}$ $\Omega \cdot cm$) | 10 | 8 | 8 | 4 | 5 | 6 |
| DC breakdown strength (kV/mm) | 125 | 115 | 110 | 55 | 80 | 95 |
| Impulse strength (kV/mm) | 110 | 105 | 100 | 120 | 60 | 80 |

As shown in Table 2, the sections of examples 1 to 3 exhibited relatively higher volume resistivity and DC breakdown strength than comparative example 1 (without magnesium oxide), comparative example 2 (with terrace magnesium oxide), and comparative example 3 (with spherical magnesium oxide). That is, the sections of examples 1 to 3 using cubic magnesium oxide may exhibit excellent electrical insulating properties.

The sections of examples 1 to 3 hardly have a reduction in impulse strength when compared with comparative example 1 (without magnesium oxide). That is, although the sections of examples 1 to 3 used the surface-modified magnesium oxide which is an inorganic additive, to exhibit excellent electrical insulating properties, they showed a similar level of impulse strength to that of comparative example 1 without any inorganic additive such as magnesium oxide.

Among the sections of examples 1 to 3, the section of example 1 with the smallest average particle size exhibited excellent effects in volume resistivity, DC breakdown strength, and impulse strength.

As seen in the above results, an insulation made from an insulation material composition for a DC power cable and a power cable provided therewith may exhibit excellent effects in volume resistivity, DC breakdown strength and impulse strength. Cubic magnesium oxide was used to suppress a space charge. Secondly, magnesium oxide was surface-modified, such that the surface energy of the surface-modified magnesium oxide is similar to that of polyethylene base resin, inducing a chemical bond between the surface-modified magnesium oxide and the polyethylene base resin to ensure an optimum dispersion. Thirdly, the components of the insulation material composition were mixed at a proper content.

According to teachings above, there is provided an insulation material composition which may provide, when used with an insulation of a DC power cable, an increased volume resistivity and an excellent space charge suppression effect.

A number of examples have been described above. Nevertheless, it will be understood that various modifications may be made. For example, suitable results may be achieved if the described techniques are performed in a different order and/or if components are combined in a different manner and/or replaced or supplemented by other components or their equivalents. Accordingly, other implementations are within the scope of the following claims.

What is claimed is:

1. A direct current (DC) power cable insulation material composition, comprising:
   0.5 to 5 parts by weight of surface-modified nano-sized cubic magnesium oxide, per 100 parts by weight of a polyethylene base resin, the magnesium oxide having an average particle size of 500 nm or less.

2. The composition according to claim 1, further comprising, per 100 parts by weight of the polyethylene base resin:
   0.1 to 3 parts by weight of a dicumyl peroxide crosslinking agent; and
   0.1 to 2 parts by weight of an additive, the additive including an antioxidant, an ion scavenger, or a combination thereof.

3. The composition according to claim 2, wherein the magnesium oxide has a purity of 99.9% or greater.

4. The composition according to claim 2, wherein the magnesium oxide is monocrystalline or polycrystalline.

5. A DC power cable, comprising:
   an insulation comprising the DC power cable insulation material composition of claim 2.

6. The composition according to claim 1, wherein the magnesium oxide has a purity of 99.9% or greater.

7. The composition according to claim 1, wherein the magnesium oxide is monocrystalline or polycrystalline.

8. A DC power cable, comprising:
   an insulation comprising the DC power cable insulation material composition of claim 1.

9. The DC power cable according to claim 8, wherein the DC breakdown strength of the insulation is 110 kV/mm or greater.

10. The composition according to claim 1, further comprising:
    0.1 to 2 parts by weight of an additive dispersed in the polyethylene base resin per 100 parts by weight of the polyethylene base resin, the additive including an antioxidant, an ion scavenger, or a combination thereof.

11. The composition according to claim 10, wherein the antioxidant includes amine-based antioxidants, dialkylester-based antioxidants, thioester-based antioxidants, phenol-based antioxidants, or a combination thereof.

12. The composition according to claim 11, wherein the ion scavenger includes aryl-based silane.

13. The composition according to claim 1, wherein the nano-sized cubic magnesium oxide is surface-modified with vinyl silane.

14. The composition according to claim 1, wherein the DC breakdown strength of an insulation obtained from the composition is 110 kV/mm or greater.

15. An insulation material composition, comprising:
    0.5 to 5 parts by weight of surface-modified nano-sized cubic magnesium oxide, per 100 parts by weight of a polyethylene base resin,
    wherein the magnesium oxide has an average particle size of 500 nm or less, and the DC breakdown strength of an insulation obtained from the composition is 110 kV/mm or greater.

16. The insulating material composition of claim 15, wherein the polyethylene base resin is a crosslinked low-density polyethylene base resin.

* * * * *